Dec. 18, 1951  F. R. SIAS  2,579,344
ANEMOMETER CONSTRUCTION
Filed March 14, 1947
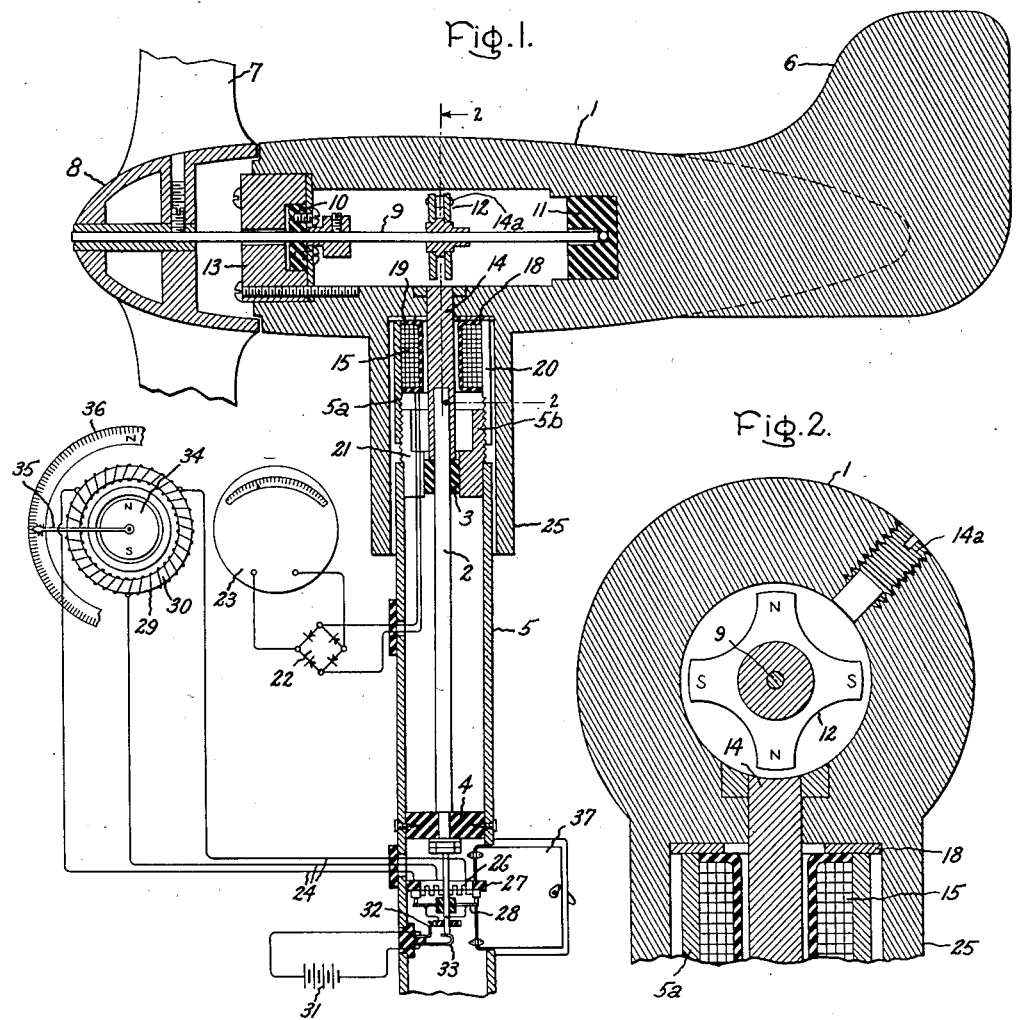
Inventor:
Frederick R. Sias,
by Crowell S. Mack
His Attorney.

Patented Dec. 18, 1951

2,579,344

UNITED STATES PATENT OFFICE 2,579,344

ANEMOMETER CONSTRUCTION

Frederick R. Sias, Marblehead, Mass., assignor to General Electric Company, a corporation of New York Application March 14, 1947, Serial No. 734,612

5 Claims. (Cl. 73—189)

My invention relates to an anemometer for measuring wind velocity and direction and transmitting such measurements for indication at a distant point, and its object is to provide reliable, accurate, and low-cost apparatus for this purpose. The measurements of wind velocity are obtained by means of a tachometer generator the rotor of which is driven on a horizontal axis of rotation by a propeller which is kept headed into the wind by a wind vane, the generator rotor being effectively positioned in vertical alignment with the vertical axis of rotation of such wind vane. The stator of the generator is coaxial with the vertical axis of rotation of the wind vane and has a stationary generating coil, and is otherwise arranged to generate a measurement voltage proportional to wind velocity regardless of wind direction and to transmit a corresponding electric signaling current without slip rings or other forms of contacts. The stator magnetic circuit of this generator also constitutes the vertical wind vane shaft and operates a wind direction measurement transmitter.

The features of my invention which are believed to be novel and patentable will be pointed out in the claims appended hereto. For a better understanding of my invention reference is made in the following description to the accompanying drawing in which Fig. 1 represents a cross-sectional view of a wind velocity tachometer generator and wind direction transmitter embodying my invention and indicating the electrical connections therefrom to distant indicators, and Fig. 2 shows an end view of the tachometer generator rotor.

Referring now to the drawing, 1 represents a wind vane body which may be made of wood or plastic. The vane 1 is secured to and pivoted by a vertical shaft 2 in suitable bearings at 3 and 4 contained in a hollow vertical supporting conduit 5. The vane 1 has a tail 6 so that its opposite end will head into the wind when the vane is exposed thereto. The forward end is provided with a suitable propeller having blades indicated at 7, secured to a nose 8 mounted on the forward end of a shaft 9. Shaft 9 is rotatively mounted on a horizontal axis in bearings at 10 and 11. On shaft 9 preferably in line with the vertical shaft 2, or some equivalent arrangement, is a rotor 12 of a tachometer generator. The rotor 12 is made of permanent magnet material and polarized to have alternate north and south poles evenly spaced about its axis of rotation and, as shown in Fig. 2, may have a salient pole construction. The vane structure and parts carried thereby are balanced as by a counterweight at 13 so as to have the center of gravity in line with shaft 2. The vertical shaft 2 or at least the upper portion 14 thereof is made of magnetic material and is preferably laminated to reduce eddy current losses therein. The upper end of shaft portion 14 extends in the vicinity of the path of rotation of the pole pieces of the rotor 12 and as a result, pulsating flux changes occur in shaft portion 14 when the rotor 12 is driven by the propeller 7—8. The frequency of these changes is proportional to rotor speed and wind velocity to which the device is subjected and is independent of wind direction or the direction in which the vane may be headed or turned about its vertical axis, because the turning of the vane structure about the vertical axis does not change the magnetic coupling between the rotor 12 and the magnetic shaft portion 14.

The upper end of shaft portion 14 may be considered as the stator pole piece of a tachometer generator having the rotor 12, and the generating winding of which comprises a stationary coil 15 through which the shaft portion 14 extends. The coil 15 is concentric with the shaft part 14 and is secured near the upper end and within the upper tubular conduit housing section 5a. Preferably, the upper ends of the conduit such as sections 5a and 5b are made of magnetic material to improve the return flux path of the tachometer generator. Also, the vertical position of coil 15 is preferably made adjustable for voltage adjustment and calibration purposes. To this end conduit section 5a carrying the coil 15 is screw-threaded to section 5b so that by turning section 5a, the vertical position of the coil may be adjusted. Moving the coil toward the rotor improves the flux coupling and increases the voltage that will be generated. This tachometer generator is also preferably provided with temperature compensation and for this purpose I provide a washer-shaped shunt 18 between the conduit section 5a and pole piece shaft section 14 just above coil 15. This shunt is made of a low permeability material which has a negative temperature coefficient of permeability so that as the temperature increases it shunts less and less flux. A material suitable for this purpose may be composed of a copper nickel alloy prepared as described in United States Patent No. 1,706,172 to Kinnard. This compensation is made sufficient to compensate for the temperature errors of the generator system which are largely due to the increase of resistance in the generator circuit with rise in temperature. The shunt 18 does not completely close the gap between parts 5a and 14 and shunts a relatively small portion of the available flux even at the lowest temperatures likely to be encountered.

To avoid the effect of short circuited conductor turns about the flux path, the washer 18 and the conduit sections 5a and 5b are preferably provided with vertical slots as indicated at 19, 20, and 21. When the apparatus is finally adjusted these slots will preferably be in alignment, in which position they will be most effective for the purpose described.

When the generator is operated, an alternating flux will thread coil 15 and an alternating current voltage will be induced therein which will be proportional to generator speed. Likewise, its frequency will be proportional to generator speed, and hence, either a frequency meter or a voltmeter may be used to measure the generator output in terms of speed. I prefer to rectify the voltage by a rectifier 22 and measure the rectified voltage on a sensitive direct current instrument 23 calibrated with the apparatus in wind velocity. It is to be noted that the generator operation is the same regardless of wind direction, and that no slip rings or other contact devices are necessary in the generator or its output circuit. The housing of the vane body preferably has a tubular hood 25 which comes down over the top of the conduit 5 and protects the upper portion thereof from rain, etc.

It will be noted from Fig. 2 that the generator has an idle stator pole piece 14a in the form of a threaded set screw made of magnetic material and positioned midway between the rotor pole pieces when one of the rotor pole pieces is in alignment with the wound rotor pole piece 14. The pole piece 14a is contained in a threaded hole in the body of the wind vane opposite the rotor 12 and is adjustable toward and away from the rotor by means of a screw driver. Its purpose is to offset and thus reduce the magnetic locking torque produced between the rotor and the active generator pole 14. Thus in Fig. 2, the tendency for the rotor to stay in the position shown due to the attraction between pole piece 14 and the rotor pole piece opposite thereto is largely offset by the tendency of the rotor to move one-eighth of a revolution, so that one of its poles will align with the pole piece 14a. This feature reduces the generator locking torque and likewise the power necessary to drive it during running, and hence, enables the wind velocity to be measured more accurately down to lower values than would otherwise be the case.

The shaft 2 with its upper portion 14 is used not only as a pole piece for the generator and to rotatively support the wind vane but is also used to operate a transmitter for the purpose of indicating wind direction at a distant point. Any suitable form of motion transmitter may be used. I have represented a form of rotary motion transmitter and receiver of the type shown in Fig. 1 of United States Patent No. 2,248,616 comprising a stationary resistance ring 26 secured concentrically with the lower end of shaft 2 by an insulating ring 27 and a two-arm brush rigging 28 bearing on the resistance ring at opposite diameter points and mounted on shaft 2 below the lower bearing 4 so as to be rotated with the wind vane in accordance with changes in the direction of the wind. The resistance ring is tapped at three equidistant points with connections 24 that lead to a receiver having a ring stator winding 29 on a ring core 30. A source 31 of direct current is connected across the two brush arms and fed into the resistance ring 26 through brushes 32 and 33. The direct current flows through the connections 28 to the receiver and produces a field within the ring stator having a direction and distribution dependent upon the position of the brushes of the transmitter. The rotor of the receiver is a cylindrically shaped two-pole permanent magnet 34 and therefore positioned in accordance with the field produced in the stator. The rotor carries a pointer 35 indicating on a compass card scale 36. When the apparatus is properly adjusted, the pointer 35 will follow the movements of the wind vane 1 and correctly indicate the direction of the wind.

The tubular housing 5 may have a door 37, indicated as being open, to afford access to the transmitting mechanism just described. Ordinarily when the apparatus is located on a roof, the wiring will be run down through the housing 5 to the interior of the building where the receiver instruments are located. More than one set of the receiver instruments may be energized from the same transmitters.

What I claim as new and desire to secure by Letters Patent of the United States is:

1. An anemometer comprising a wind vane structure mounted for rotation on a vertical axis, a propeller secured on a horizontal shaft on said structure, said propeller being designed to be driven by the wind at a speed proportional to wind velocity, a polarized rotor structure having alternate north and south poles mounted on said horizontal shaft so as to be driven by said propeller, a vertical shaft for rotatively supporting the wind vane on its vertical axis of rotation, said shaft having an upper portion of magnetic material extending into the vicinity of the path of rotation of said polarized rotor so as to have an alternating flux induced therein when the rotor rotates, the magnetic coupling between the rotor and magnetic shaft portion being independent of the direction in which said wind vane may be headed, a stationary structure having bearings for supporting the vertical shaft, a coil mounted on said stationary structure surrounding said magnetic shaft section so as to have an alternating voltage induced therein when the rotor is driven by said propeller, which voltage has a component proportional to the rotor speed and an electrical measuring instrument connected to said coil for the measurement of the speed component of said voltage in terms of wind velocity.

2. An anemometer comprising a wind vane mounted for free rotation on a vertical axis, a horizontal shaft rotatively mounted on said vane structure along the directional axis of the vane, a wind propeller secured on said shaft so as to drive the shaft at a speed proportional to wind velocity, a polarized rotor having alternate north and south magnetic poles secured to said shaft on the vertical axis of rotation of the vane, a vertical shaft on the vertical axis of rotation of said vane for rotatively supporting said wind vane on said axis, said shaft having a magnetic section which extends into the vicinity of the path of rotation of said rotor so as to have an alternating flux induced therein as the rotor rotates, a stationary structure having bearings for rotatively supporting said vertical shaft, a stationary coil on said structure surrounding said magnetic shaft section so as to have an alternating voltage induced therein of a frequency proportional to wind velocity when said rotor is driven by the wind propeller, and a rectifier instrument connected to be energized by said coil and calibrated with the anemometer to indicate wind velocity.

3. Anemometer apparatus for producing remote indications of wind velocity and direction comprising a wind vane having a vertical rotary shaft for rotatively mounting the vane so it will head into the wind, said vane having a horizontal shaft rotatively mounted and extending along the directional axis of said vane, a propeller on said horizontal shaft for driving the same at a speed proportional to wind velocity, a polarized rotor having alternate north and south magnetic poles on and driven by said horizontal shaft, stationary bearing supporting structure for rotatively supporting said vertical shaft, said vertical shaft having a magnetic portion extending into flux inductive coupling relation with said polarized rotor so as to have an alternating flux induced therein when the rotor rotates, said flux inductive coupling being independent of the horizontal directional position of said wind vane, a stationary coil supported by said stationary supporting structure surrounding said magnetic shaft portion so as to have an alternating voltage induced therein which is proportional to wind velocity, an electrical directional transmitter operated by the rotational movement of said vertical shaft for transmitting signals indicative of wind direction and a pair of remotely located electrical indicators, one connected to said stationary coil and responsive to the voltage generated therein for producing an indication of wind velocity and the other connected to said directional transmitter and responsive to the signals transmitted thereby for indicating wind direction.

4. In an anemometer, an electric generator transmitter for obtaining a voltage representative of wind velocity without the use of slip rings, comprising a polarized rotor having alternate north and south magnetic poles and mounted for rotation on a horizontal shaft which is maintained in alignment with the direction of the wind and driven at a speed proportional to wind velocity, a wind vane on which said rotor and its shaft are supported and driven, a vertical shaft for rotatively supporting said wind vane about its vertical axis of rotation and having a portion of magnetic material extending into the vicinity of the path of rotation of the magnetic poles of said rotor so as to have an alternating flux induced therein proportional to wind velocity, a stationary coil about said magnetic shaft portion in which a voltage is generated by said flux, and a generally cup-shaped stationary magnetic supporting structure surrounding said coil and acting as a flux return path for said generator, the open end of said cup structure facing toward said rotor and the other end of said cup containing a bearing for said vertical shaft, and a washer-shaped shunt of a material having a negative temperature coefficient of magnetic permeability between the magnetic shaft portion and the open end of said cup for compensating the generator for temperature variations in order that the voltage generated will be proportional to wind velocity, said cup and shunt having slits therein so that they do not form closed circuited current paths about the vertical magnetic shaft portion.

5. An anemometer comprising a wind vane structure mounted for rotation on a vertical axis, a propeller secured on a horizontal shaft on said structure, said propeller being designed to be driven by the wind at a speed proportional to wind velocity, a polarized rotor structure having alternate north and south poles mounted on said horizontal shaft so as to be driven by said propeller, a vertical shaft for rotatively supporting the wind vane on its vertical axis of rotation, said shaft having an upper portion of magnetic material extending into the vicinity of the path of rotation of said polarized rotor so as to have an alternating flux induced therein when the rotor rotates, the magnetic coupling between the rotor and magnetic shaft portion being independent of the direction in which said wind vane may be headed, a stationary structure having bearings for supporting the vertical shaft, a coil mounted on said stationary structure surrounding said magnetic shaft section so as to have an alternating voltage induced therein when the rotor is driven by said propeller, which voltage has a component proportional to the rotor speed, an electrical measuring instrument connected to said coil for the measurement of the speed component of said voltage in terms of wind velocity, and means for reducing the magnetic locking tendency of the rotor comprising a magnetic stator pole piece located adjacent the rotor at a point midway between the rotor magnetic poles when one of the rotor magnetic poles is opposite the magnetic shaft section.

FREDERICK R. SIAS.

REFERENCES CITED

The following references are of record in the file of this patent:

UNITED STATES PATENTS

| Number | Name | Date |
|---|---|---|
| 1,305,803 | Irwin | June 3, 1919 |
| 2,142,951 | Mead | Jan. 3, 1939 |
| 2,270,141 | Potter | Jan. 13, 1942 |
| 2,406,723 | Hortenau | Aug. 27, 1946 |

FOREIGN PATENTS

| Number | Country | Date |
|---|---|---|
| 796,829 | France | Jan. 14, 1935 |
| 413,804 | Great Britain | July 26, 1934 |